(12) United States Patent
Tierney et al.

(10) Patent No.: US 7,546,359 B2
(45) Date of Patent: Jun. 9, 2009

(54) METHOD AND APPARATUS FOR MANAGING A PEER-TO-PEER COLLABORATION SYSTEM

(75) Inventors: William D. Tierney, Methuen, MA (US); Kenneth G. Moore, Westford, MA (US)

(73) Assignee: Groove Networks, Inc., Beverly, MA (US)

( * ) Notice: Subject to any disclaimer, the term of this patent is extended or adjusted under 35 U.S.C. 154(b) by 680 days.

(21) Appl. No.: 10/036,275

(22) Filed: Oct. 24, 2001

(65) Prior Publication Data
US 2003/0236820 A1 Dec. 25, 2003

(51) Int. Cl.
*G06F 15/173* (2006.01)
*G06F 15/16* (2006.01)

(52) U.S. Cl. .................. 709/223; 709/206; 709/229

(58) Field of Classification Search ............... 709/203, 709/217, 219, 205, 204, 207, 223, 206, 229; 726/26; 705/59
See application file for complete search history.

(56) References Cited

U.S. PATENT DOCUMENTS

| | | | | |
|---|---|---|---|---|
| 6,035,337 | A * | 3/2000 | Redpath et al. ............. | 709/234 |
| 6,144,991 | A * | 11/2000 | England ..................... | 709/205 |
| 6,158,011 | A * | 12/2000 | Chen et al. .................... | 726/15 |
| 6,223,177 | B1 | 4/2001 | Tatham et al. | |
| 6,366,948 | B1 * | 4/2002 | Teibel ........................ | 709/204 |
| 6,466,969 | B1 * | 10/2002 | Bunney et al. .............. | 709/206 |
| 6,557,027 | B1 * | 4/2003 | Cragun ....................... | 709/204 |
| 6,567,813 | B1 * | 5/2003 | Zhu et al. .................... | 707/100 |
| 6,697,861 | B2 * | 2/2004 | Barnier et al. .............. | 709/225 |
| 6,813,733 | B1 * | 11/2004 | Li et al. ........................ | 714/47 |
| 6,816,596 | B1 * | 11/2004 | Peinado et al. .............. | 380/277 |
| 6,816,882 | B1 * | 11/2004 | Conner et al. ............... | 709/203 |
| 7,069,295 | B2 * | 6/2006 | Sutherland et al. .......... | 709/203 |
| 2002/0069420 | A1 * | 6/2002 | Russell et al. ................ | 725/92 |

(Continued)

FOREIGN PATENT DOCUMENTS

GB 0794646 * 5/1997

(Continued)

OTHER PUBLICATIONS

"Dynamic Registry Updates for COM Servers in MSI", IBM Technical Disclosure Bulletin, No. 446, p. 1070.

(Continued)

*Primary Examiner*—Larry D Donaghue
*Assistant Examiner*—Karen C Tang
(74) *Attorney, Agent, or Firm*—Wolf, Greenfield & Sacks, P.C.

(57) ABSTRACT

Users and devices in a peer-to-peer collaboration system can join a management domain in which members are administered as a group by a centralized management server operated by an enterprise. In response to a administrator request to join the management domain, the user downloads an injectible identity file containing a definition of the managed user/device into the user system. The user then joins the managed domain by associating the injected identity with their actual identity. Once a user or device is part of a management domain, that user or device receives license rights and policy restrictions that are associated with the domain. In return, the management server interacts with the individual peer-to-peer collaboration systems to enable the enterprise to monitor the usage of, and control the behavior of, that specific identity within the peer-to-peer collaboration system.

37 Claims, 4 Drawing Sheets

U.S. PATENT DOCUMENTS

| | | | |
|---|---|---|---|
| 2002/0120760 A1* | 8/2002 | Kimchi et al. | 709/230 |
| 2003/0041108 A1* | 2/2003 | Henrick et al. | 709/205 |
| 2003/0055892 A1* | 3/2003 | Huitema et al. | 709/204 |
| 2003/0069821 A1* | 4/2003 | Williams | 705/36 |
| 2003/0105812 A1* | 6/2003 | Flowers et al. | 709/203 |
| 2005/0102364 A1* | 5/2005 | Ozzie et al. | 709/207 |
| 2005/0271208 A1* | 12/2005 | England et al. | 380/269 |
| 2005/0273435 A1* | 12/2005 | Coley et al. | 705/59 |
| 2006/0041620 A1* | 2/2006 | Nandhra | 709/206 |
| 2007/0136817 A1* | 6/2007 | Nguyen | 726/26 |
| 2007/0192474 A1* | 8/2007 | Decasper et al. | 709/223 |

OTHER PUBLICATIONS

Du, W., et al., "Security Relevancy Analysis on the Registry of Windows NT 4.0", Computer Security Applications Conference, 1999, Phoenix, Arizona, US, Dec. 6-10, 1999, Los Alamitos, CA, USA.

* cited by examiner

METHOD AND APPARATUS FOR MANAGING A PEER-TO-PEER COLLABORATION SYSTEM

FIELD OF THE INVENTION

This invention relates to peer-to-peer collaboration systems and, in particular to methods and apparatus for gathering usage statistics for managing such systems.

BACKGROUND OF THE INVENTION

New collaboration models have been developed which operate in a "peer-to-peer" fashion without the intervention of a central authority. One of these latter models is built upon direct connections between users in a shared private "space". In accordance with this model, users can be invited into, enter and leave a shared space during an ongoing collaboration session between other users. Each user has an application program called an "activity", which is operable in his or her personal computer system, communication appliance or other network-capable device which generates a shared "space" in that user's computer. The activity responds to user interactions within the shared space by generating data change requests, called "deltas." The activity also has a data-change engine component that maintains a local data copy and performs the changes to the data requested by the deltas. The deltas are distributed from one user to another over a network, such as the Internet, by a dynamics manager component. When the deltas are received by another user activity in the shared space, the local data copy maintained by that activity is also updated.

Subprograms within the activity program called "tools" perform various specific tasks. For example, an activity program might present various computer games. Within the overall game activity, tools might be available for a chess game and a tic-tac-toe game. Tools are defined by a template that is a document written in Extended Markup Language or XML. The XML template has various sections or tagged blocks that define various attributes of the tool that it defines.

An application constructed in accordance with this model consists of a collection of software components and resources, all of which are targeted for execution on a particular device. As used herein the term "components" will be used to refer to both the software code and the resources that are required for an application. This type of collaboration system is described in detail in U.S. patent application Ser. No. 09/357,007 entitled METHOD AND APPARATUS FOR ACTIVITY-BASED COLLABORATION BY A COMPUTER SYSTEM EQUIPPED WITH A COMMUNICATIONS MANAGER, filed Jul. 19, 1999 by Raymond E. Ozzie, Kenneth G. Moore, Robert H. Myhill and Brian M. Lambert; U.S. patent application Ser. No. 09/356,930 entitled METHOD AND APPARATUS FOR ACTIVITY-BASED COLLABORATION BY A COMPUTER SYSTEM EQUIPPED WITH A DYNAMICS MANAGER, filed Jul. 19, 1999 by Raymond E. Ozzie and Jack E. Ozzie; U.S. patent application Ser. No. 09/356,148 entitled METHOD AND APPARATUS FOR PRIORITIZING DATA CHANGE REQUESTS AND MAINTAINING DATA CONSISTENCY IN A DISTRIBUTED COMPUTER SYSTEM EQUIPPED FOR ACTIVITY-BASED COLLABORATION, filed Jul. 19, 1999 by Raymond E. Ozzie and Jack E. Ozzie and U.S. patent application Ser. No. 09/588,195 entitled METHOD AND APPARATUS FOR EFFICIENT MANAGEMENT OF XML DOCUMENTS, filed Jun. 6, 2000 by Raymond E. Ozzie, Kenneth G. Moore, Ransom L. Richardson and Edward J. Fischer.

The aforementioned collaboration system has several specific advantages over centralized systems. These advantages include reduced centralized management resources, reduced server storage resources, and optimized computing resources. For example, in many systems, teams of co-workers share information in a shared space. In a system that can have many such co-worker teams, any number of which could be actively online at any given time, due to the resources consumed, administrators would have to police who could and could not create spaces. Similarly, the administrators would have to backup the shared spaces. Further, since most of the time no single member of a team assumes the responsibility of declaring the collaboration to be "over," administrators would have to prod workers to delete their shared spaces.

However, in a peer-to-peer collaborative environment, each member of a coworker team makes use of his or her own local computing resources, without any worst-case capacity planning necessary. There is no need to have bandwidth, processing and storage enough to support the entire universe of users, only enough to support his or her own usage. In addition, when an individual user finds that stored assets no longer merit storage on a local machine, he or she can delete them without having to ask permission of the rest of the team. This eliminates the administrative burden of managing access to services, backing up resources that may be obsolete, and tracking down abusers of the system.

Further, peer-to-peer collaboration systems can also reduce storage resource requirements. For example, a common network inefficiency arises when a single e-mail is sent with a file attachment to multiple recipients and some recipients reply to other recipients with the file still attached. Not only does this operation unnecessarily tax the network, but most client/server messaging systems will store a replica of the message and its attachments on both the client and the server. Peer-to-peer file transfer can minimize network traffic by sending the file only to those recipients who need to obtain a copy thereby eliminating redundant storage.

Peer-to-peer collaboration systems also make direct use of local computing resources in business-to-business and business-to-consumer settings. For example, a person-to-person customer service application can move content directly to the personal desktops of customer support personnel as well as to the desktop of the customer, instead of to a corporate Web server, thereby effectively distributing the computing and network resources accordingly. Likewise, a cross-company team conducting business-to-business planning will connect directly with each other instead of meeting "at" a centralized Web site.

Even though peer-to-peer collaboration systems have some distinct advantages, in many cases, it is difficult to deploy, manage and monitor these systems, particularly in large organizations. Since central administration is not necessary to run these systems and, indeed, many systems affirmatively insure the privacy of the participants, it may be difficult for administrators to monitor usage of such systems in order to improve the services. Nevertheless, managers have a legitimate and necessary responsibility to track usage of enterprise computing resources, at least in the aggregate, to allow managers to determine application utility and to intelligently anticipate capacity planning requirements.

Further, since there is no central location with which all users must interact, there is also no central authority to enforce licensing restrictions or payment terms that may be imposed by some software developers on the transfer, or use, of software components that they developed. In addition, software components that incorporate other software components may require that licenses be obtained from several vendors, thereby making the licensing process complicated.

Thus, there is a need for monitoring system usage without violating the privacy of the individual users.

In addition, there is a need for a method and apparatus that can automatically enforce licensing restrictions without requiring that a user continuously collaborate with a central location.

SUMMARY OF THE INVENTION

In accordance with the principles of the invention, users and devices can voluntarily join a management domain in which members are administered as a group by a centralized management server operated by an enterprise. Once a user or device is part of a management domain, that user or device receives all license rights and policy restrictions defined by the administrator as associated with the domain. In return, the management server interacts with the individual peer-to-peer collaboration systems to enable the enterprise to monitor the aggregate usage of such systems. The management server allows the enterprise to measure and monitor the overall usage of collaborative software and services, as well as detail on the usage of specific tools and capabilities. The management server does not access data within the shared spaces, but still allows administrators to understand how the collaborative software is being used in the enterprise.

In accordance with one embodiment, users or devices join a management domain by a request to administrative personnel (or, more likely, in response to a directive from administrative personnel) to become managed users or devices. The user or device then receives information from the management server containing a definition of the managed user/device that they apply to their system. In the case of a user, this information is in the form of a file containing an injectible identity. In the case of a device, the information is in the form of device information. The injectible identity or device information allows the managed user/device to obtain license rights and policy restrictions and also allows the management server to track system usage. The user or device joins the managed domain by associating their actual identity or device information with the identity or device information defined on the management server.

BRIEF DESCRIPTION OF THE DRAWINGS

The above and further advantages of the invention may be better understood by referring to the following description in conjunction with the accompanying drawings in which.

DETAILED DESCRIPTION

Figure 1:
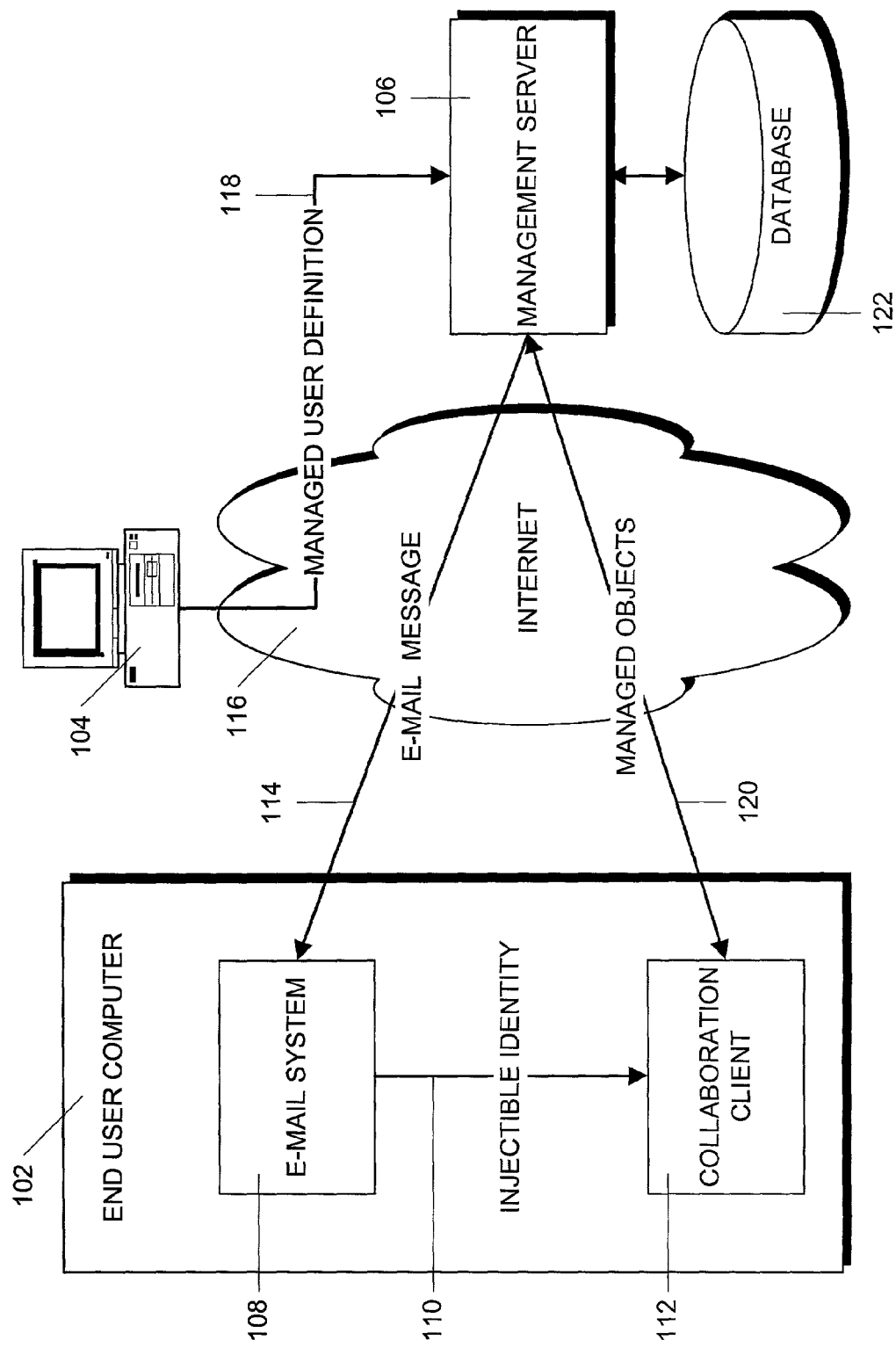
FIG. 1 is a block schematic diagram of a managed system illustrating how a user becomes part of a managed domain.

FIG. 1 shows an illustrative management system 100 that includes a management server 106 that stores information in a database 122. This could be a software product sold to customers to allow the collaborative software to be centrally managed. Alternatively, the management software could run at a central location and the management system sold as a service to customers. In this case, all administration of the collaborative software is performed on the centralized site which may be a web site on the Internet.

The management system 100 creates management domains, which are collections of managed users and managed devices, that are defined and administered as a group, on the management server 106. In one embodiment of a collaborative system, each user has one or more "identities." An identity is the name by which other collaborative users recognize the user. For example, it might be a name that is displayed in shared spaces to which the user belongs, or is displayed in contact lists that other user see when they send instant messages. Each identity may have encryption keys associated with it that are used to encode messages that are sent and received by the identity.

In addition, each user in the collaborative system has an account that is necessary in order to use the collaborative software. An account is a file stored on the end-users computer 102 that maintains information such as one or more identities, and their secret encryption keys, the end-user computer systems on which the collaborative software is run, references to the shared spaces in which the user is a member and information about the people with which the user communicates and their identities.

In another embodiment, a user can create multiple identities for the same account. For example, the user might have one identity when using the collaborative software for business activities and another identity when using the software to communicate with friends and family. A managed user is a special "identity" within a user account that is a member of, and administered through, a management domain. Similarly, a managed device is a machine, such as end-user computer 102 running collaborative client software 112, which machine is a member of, and administered through, a management domain.

In accordance with the principles of the invention, the management system uses injectible identities in order to permit a user to join a managed domain. An injectible identity is a file containing a definition of a managed user, and a definition of how the collaborative client software 112 should communicate with the management server. In one embodiment this file may be XML-based. A sample XML injectible identity file is as follows:

```
<g:fragment xmlns:g="urn:groove.net">
<g:ManagedObject Version="0,0,0,0">
<g:Header DeviceSpecific="0" IntendedIdentityURL=""
        Description=""
        ReplacementPolicy="$Never"
        IssuedTime="1.00367485856E+012"
        GUID="5m6bstra6s33svfm7ztmc39im4gca7i8ge3uqpa"
        Name="grooveIdentity:///5m6bstra6s33svfm7ztmc39im4gca7i8ge3uqpa"
        DisplayName="Bill Tierney">
```

-continued

```
    <g:Issuer DisplayName="Groove Networks Inc." Name="urn:groove.net: "/>
    <g:ManagementDomain ServerURL="http:csm.groove.net/managedservices"
        DisplayName="Tierney's Domain"
        Name="9h8ep3jp3grddut7mc25c7a4wqkviyw2uci33ra"
        Certificate="Lm5IdApUSVRMRTpDb25zdWx0aW5nlEV"/>
</g:Header>
<g:Body
ComponentResourceURL="http://components.groove.net/Groove/Components/Root.os
d?Package=net.groove.Groove.SystemComponents.GrooveAccountMgr_DLL&Ver
sion=0&Factory=IdentityTemplate">
    <g:IdentityTemplate>
        <g:ContactTemplate>
            <g:vCard Data="QkVHSU46VkNBUkQKVkVSU0IPTjoyL
                jEKRk46QmlsbCBUaWVybmV5Ck46VGHcm5leTtCaWxsCk
                VNQUIMO0IOVEVSTkVUO1BSRUY6YnRpZXJuZXIAZ3Jvb
                3ZILm5IdApUSVRMRTpDb25zdWx0aW5nlEVuZ2luZWVyCk
                9SRzpHcm9vdmUgTmV0d29ya3MsIEIuYwpBRFI7UE9TVE
                FMO1dPUks6OzsxMDAgQ3VtbWIuZ3MgQ2VudGVyIFN1aX
                RIIDUzNVE7QmV2ZXJseTtNQTswMTkxNTtVU0EKVEVMO
                1dPUks7Vk9JQ0U6KDk3OCkgNzlwLTIxMTgKVEVMO1dPU
                ks7RkFYOihudWxsKQpURUw7UEFHRVI6KG51bGwpCkVO
                RDpWQ0FSRAo="/>
        </g:ContactTemplate>
    </g:IdentityTemplate>
</g:Body>
    <g:Signatures>
        <g:Signature Fingerprint="5eae-3d04:e016-3bdf:ef63-5a54:0d1c-
            5f72:efdf-57c2"
            Value="iqval5RfBqOuTceCadLccOudApz/5/s6ZAVJ02CDOd
            CbqOJScxkDdBSyb8qEccymVXKajFDE29RKhlaH0f8vnf7q1
            Xg3UJnubdR5RpiF8IINvPI2OOt2kbyd8Sfz9865L7I9/pUGI+1
            9v2zGfZv/CTahGcbGpiKrMmPcLOVISHDBc45PAjJP7I3e6hh
            qMrAjPx1tPYQn/zrtH80cQCKOn9o7DT7rmvce/XYnngDeEb
            9vHnMCmVlflptXhyddwtFr"/>
    </g:Signatures>
</g:ManagedObject>
</g:fragment>
```

Figure 2A:
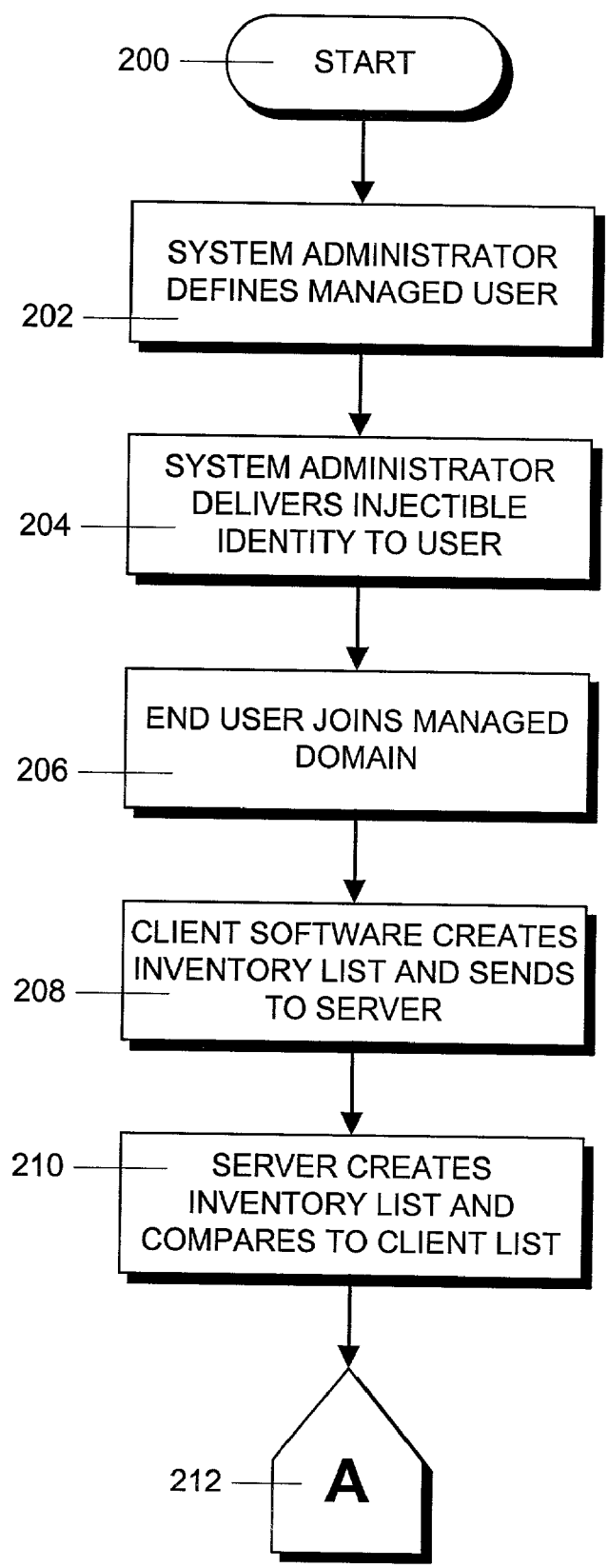
FIGS. 2A and 2B, when placed together, form a flowchart showing the steps in an illustrative routine for adding an end-user to a managed domain.
Figure 2B:
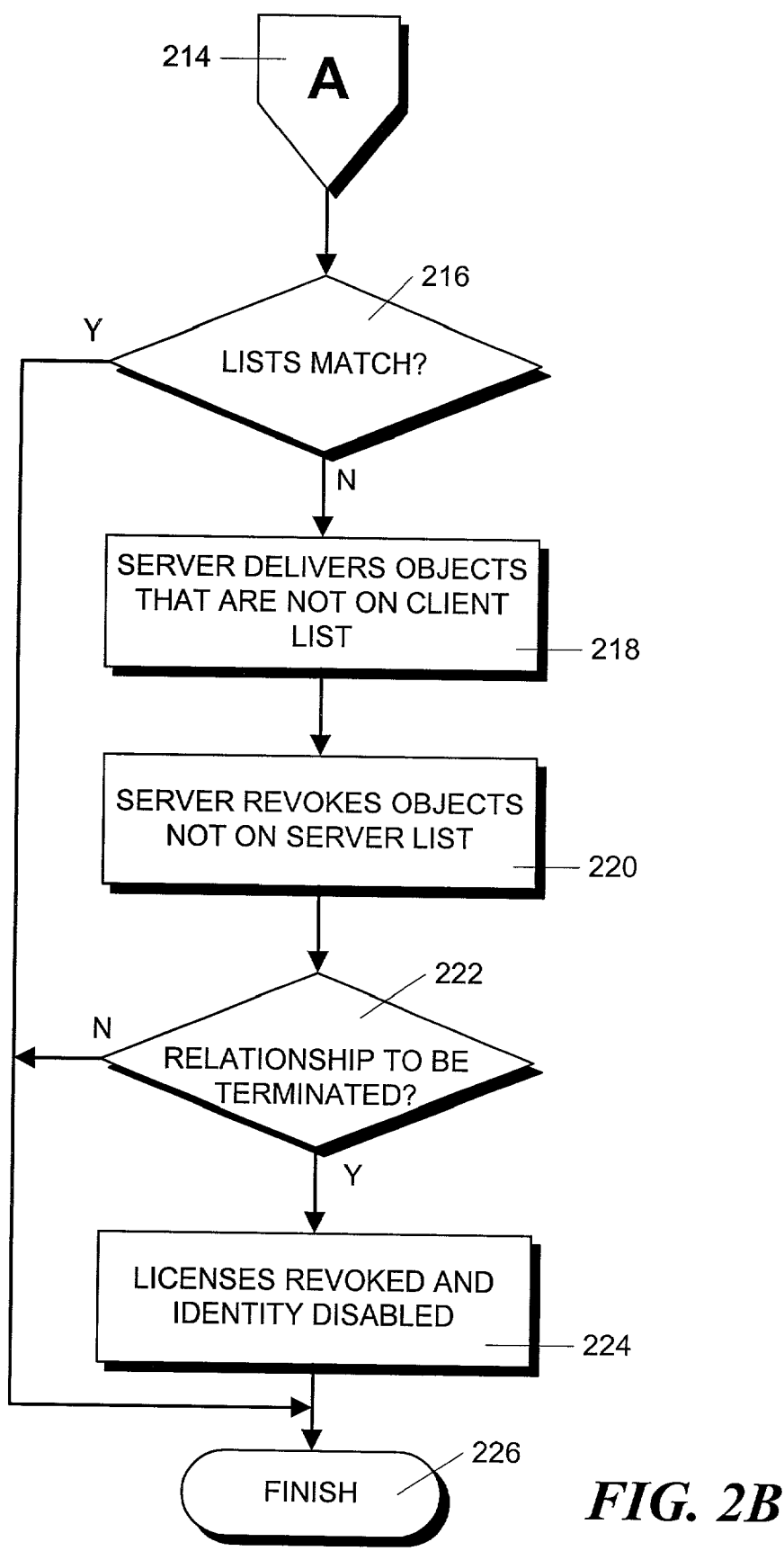

The steps in the process by which a managed "entity" that is either a managed user or managed device joins a managed domain by associating an injectible identity with an actual identity or device on a machine running the collaborative client software is illustrated in FIG. 2. This process begins in step 200 and proceeds to step 202 where a system administrator uses management software in a management terminal 104 to define one or more managed users as indicated schematically by arrow 118. Terminal 104 may have a web browser interface which is connectable, via the Internet 116, to the management server 106. A managed user is defined by supplying information for each user. This information could include user identifying information such as the company name, the full name, first and last names, title and email address. This information is stored in database 122 and used to create a mechanism by which the user can join the managed domain. This mechanism can be an injectible identity that can be a file containing an XML document which, in turn, contains the definition of the user. Alternatively, the mechanism can be a username/password pair. Either the identity file or the name/password pair may be used by an end-user to effectively "join" the management domain. Once joined, the client software identity can be centrally managed.

Alternatively, a system administrator, via the terminal 104 can create a device file, such as a Windows REG file, that can be applied to the end-user computer system 102 running the collaborative client software 112 that "joins" that device to the management domain. A sample Windows REG file is as follows:

```
REGEDIT4
[HKEY_LOCAL_MACHINE\SOFTWARE\Groove Networks,
    Inc.\Groove\ManagementDomain]
"Name"="Groove Networks"
"GUID"="9h8ep3jp3grddut7mc25c7a4wqkviyw2uci33ra"
"ServerURL"="http://www.groove.net/ManagementServer"
"Certificate"=hex:01,23,45,67,89,bc,de,f0
```

In step 204, the injectible identity and/or name/password pair (for accounts) or the registry information (for devices) is delivered to the end user. This delivery generally occurs when a download manager in the client software 302 downloads the identity or device information. In the case of an account, the administrator may choose to distribute this information automatically from the management server 106 via an email message to the e-mail system in the end-user computer 102 as indicated schematically by arrow 114. Alternatively, the system administrator may distribute the injectible identity, name/password pair or the registry information by some other means, such as floppy disks or CDs.

Next, in step 206, in the case of a managed account, the end user either injects the injectible identity file into the collaborative client software 112 by launching an attachment to the e-mail message sent from the server 106, as indicated schematically by arrow 110, or joins the management domain using the supplied username/password as input to a special add program in the client software 112. For managed devices, the end user applies the device file to the computer system 102. For example, in the case that a Windows operating system is in use in the end-user computer system 102, the device file can be a windows REG file that is applied to the system registry. These actions inform the client software 112 that the user's account and/or device will now be managed through a management domain on the management server 106.

Generally, if the user has a pre-existing account, that is the account into which the identity will be injected. An identity that is injected will become a member of the managed domain, will be subject to central administration and will receive licenses. If the user has more than one account, the injection process will prompt the user for the account into which to inject the identity. The identity is specific to a particular user and will become the default identity. Consequently, if the user attempts to inject the same identity into an additional account, the additional account will not become a member of the managed domain and will not receive licenses. In addition, an error message will be displayed notifying the user that this identity has already been injected into another account. In all cases, the identity that is created as a result of the identity injection process is the identity that will be subject to central administration and will received applicable licenses and policies.

The purpose of joining a managed domain is to "synchronize" the behavior of the client software 112 with configuration settings as defined by a system administrator. In order to perform this synchronization, selected properties and settings are transmitted between the client software 112 and the server management server 106 in the form of "managed objects" as schematically illustrated by arrow 120. These objects may contain device policies, identity policies, licenses, etc. In this context, a license is an object that enables a certain area of functionality with the client software 112, but does not deal with legal rights. Consequently, if a license exists, the associated functionality will be activated, regardless of how the license was obtained.

In all cases, the managed objects are sent between the server 106 and the client software 112 by means of a conventional transport system. The transport infrastructure between the client and the server treats these object as "opaque" and does not interact with the contents. License control and policy control software in the both the management server and the client software performs the functions of enabling and restricting functionality in the client software.

The transfer of information between the server 106 and the client software 112 would typically occur periodically, for example, hourly, and involves steps 208-216. In step 208, the client software 112, on behalf of a managed account or device, creates an inventory list of all managed objects from the current management domain that the client software 112 currently has in its possession, and sends the list to the server 106.

In step 210, when the server 106 receives the list, it creates another inventory list of the managed objects that the server determines the client should possess, and compares the two lists. The process then proceeds, via off-page connectors 212 and 214, to step 216 where a determination is made whether the client list matches the server list. If the lists match, the process ends in step 226.

Alternatively, if the lists do not match as determined in step 216, in step 218, any objects in the server list that are not in the client list cause the server 106 to deliver those objects to (and install them on) the client computer system 102 as part of the transaction. If the objects on the client list are not the current version as indicated by the server list, they can also be updated as part of the transaction. Conversely, in step 220, any objects in the client list that are not in the server list cause the server 106 to "revoke" those objects from the client computer system 102. In this manner, the client software and the server software are "synchronized." During this process, as set forth in step 222, the server 106 may also determine that the entire management relationship with the end-user has been, or should be, terminated. If this is the case, in step 224, the management server 106 will revoke all licenses and policies that the client software 112 has in its possession, which licenses and policies originated from the management domain. The server will also disable the identity in the client software 112 that was being managed by the management domain. The process then ends in step 226.

Managed domains provide license management services that allow enterprises to monitor and manage the use of the collaborative software and third party licensed products. The license management service enables administrators to assure they are in compliance with license agreements and to remotely add or remove user licenses as required.

Managed domains also provide customer service management (CSM) services that enable enterprises to monitor the usage of collaborative software within their organization and outside their organization in managed domains of suppliers and partners. Using CSM services, enterprises can measure the overall usage of the collaborative software and services, as well as detail statistics and reports on specific tool usage without violating the confidentiality of the spaces. There is still much data concerning usage of the collaborative software that can be collected while fully respecting the legitimate and necessary confidentiality of the content and identity of the members of the shared spaces themselves. This information includes the number of shared spaces created, how often the shared spaces are created, how long do the shared spaces last, how many members are included and the sets of functionality used in each shared space, the roles in individuals in the shared spaces, etc.

Figure 3:
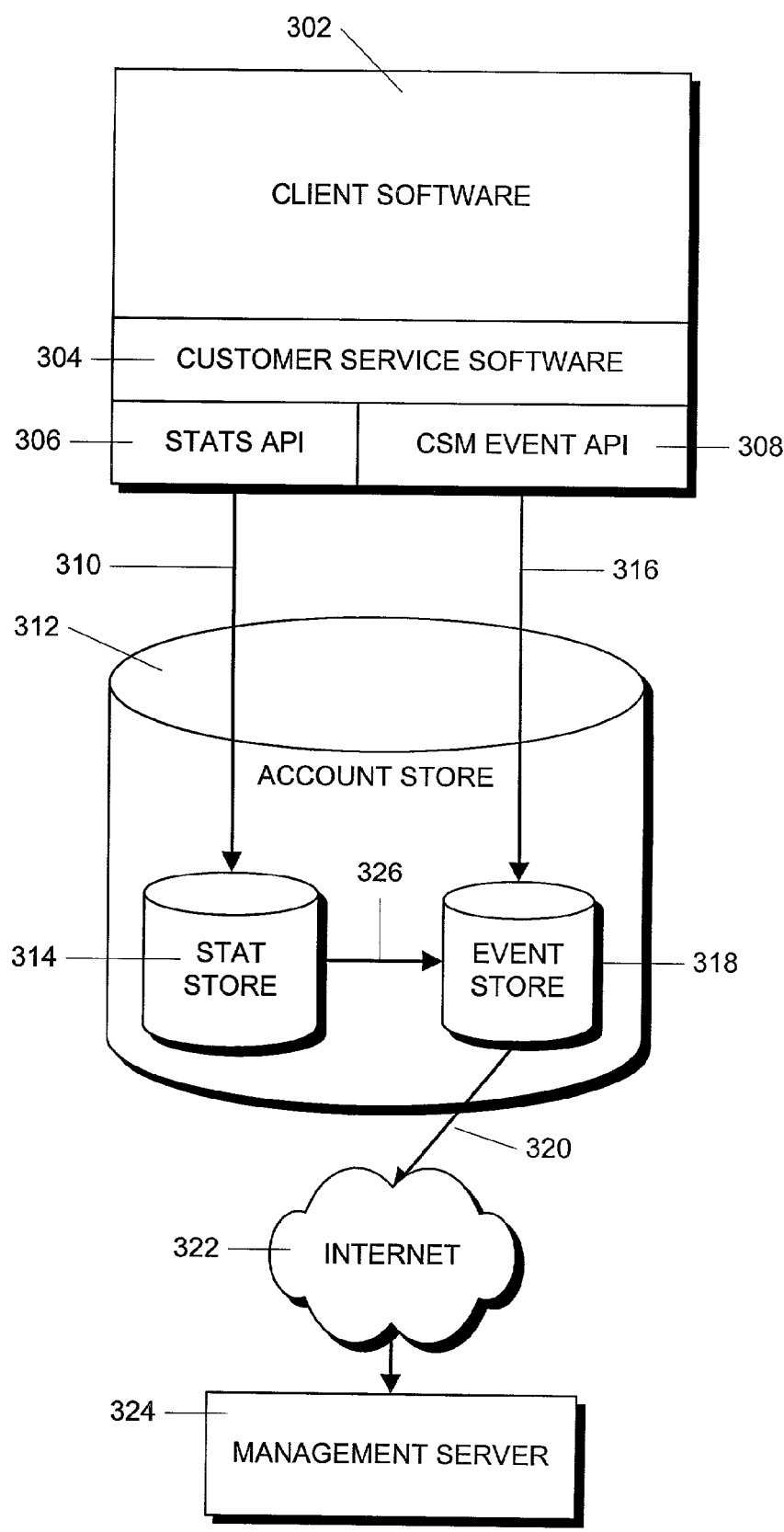
FIG. 3 is a block schematic diagram illustrating how events and statistics are stored in the client software and transferred to the management server.

A system constructed in accordance with the principles of the invention also uses a centralized monitoring service that tracks collaborative software usage in the aggregate, and to generate relatively fine-grained statistics, allowing system managers to determine application utility and to intelligently anticipate capacity planning requirements. In addition, errors and problems can be reported to the management server. In some cases, these errors can be analyzed and then the management server can appropriately respond by sending upgrade notifications to the client software. The client software can then download and install an upgrade to fix the problem. A block schematic diagram of such a system is shown in FIG. 3.

The Customer Service Management (CSM) management system 300 comprises a CSM interface 304 that runs in the end-user computer system and interacts with the collaborative client software 302. The CSM interface 304 has a statistics collection application programming interface (API) and a CSM event API 308. All statistics and events are associated with a specific account. As schematically illustrated by arrow 310, the statistical information is stored in a statistics store 314 which is located in the associated account store 312 in the end-user computer system. Events are stored in a local event store 318 in the end-user computer system as schematically illustrated by arrow 316. The information in both the statistics store 314 and the event store 318 may be encrypted for privacy. Periodically, statistics are moved from the statistics store 314 to the event store 318 as illustrated by arrow 326.

The event portion of the system generates several event types. These include statistical package events, error events and device/network configuration changes. Statistical package events are generated when a predetermined time duration has elapsed or when a predetermined number of statistics have been recorded. Error events are generated as described below. Device/network configuration events are generated when a device/network configuration changes. Such changes can include changes in the type and number of processors, processor speed, memory size, sampling bandwidth and operating system version. All events pass through the CSM interface 304 and through the CSM event API 308 and are stored in the event store. Once the events are in the event store the remainder of the system handles the events opaquely.

Each event type has attributes that are stored along with the event. These attributes include a flag indicating whether the event should be uploaded to the management server 324 and a predefined time duration that the event can remain in the event store in case it cannot be uploaded for some reason. At the end of the predefined time interval, the event is destroyed whether it has been uploaded or not. Also included is encryption information.

Periodically, the CSM interface iterates through the events in the event store 318 and sends events flagged for upload to the management server 324, via a network, such as the Internet 322 as indicated schematically by arrow 320. In one embodiment, a simple object access protocol (SOAP) is used to forward the events from the event store 318 to the management server 324. The SOAP protocol is essentially a remote procedure call over the network using XML documents. Both the client software 302 and the management server software 324 have SOAP libraries so that methods in the management server can be invoked by the client software 302.

For example, assuming a SOAP response is designated as X and a SOAP request is designated as R then the client software 302 could forward events to the management server 324 by using the following commands:
R.SetMethodName ("ReportEvents"
R.SetMethodURI ("http://www.groove.net/soap")
R.AddParameterAsString("EventName", "EventData")
X=R.Invoke("http//www.grove.net/soap/ReportEvents")

These commands create an XML document having the following format, Which is a standard SOAP message:

```
<SOAP-ENV:Envelope SOAP-
ENV:encodingStyle="http://schemas.xmlsoap.org/soap/encoding/"
xmlns:SOAP-
ENC="http://schemas.xmlsoap.org/soap/encoding/" xmlns:SOAP-
ENV="http://schemas.xmlsoap.org/soap/envelope/"
xmlns:xsd="http://www.w3.org/1999/XMLSchema"
xmlns:xsi="http://www.w3.org/1999/XMLSchema-instance">
    <SOAP-ENV:Body>
        <ns1:ReportEvent xmlns:ns1="http://www.groove.net/soap">
            <EventName xsi:type="xsd:string">EventData</EventName>
        </ns1:ReportEvent>
    </SOAP-ENV:Body>
</SOAP-ENV:Envelope>
```

This document is sent to the management server over the Internet via a suitable protocol such as HTTP. In the present case, the event strings are encrypted to preserve privacy.

Errors that occur in the client software 302 can also be reported. For example, the collaborative client can detect and record errors as they occur. Information about these errors can be stored in the local event store 318, and periodically transmitted to the management server as described previously.

It is also possible to track errors in the client software 302 over a large population of users. For example, as part of the software build process for the client software 302, certain "debug" symbols are generated to assist in debugging the code. These debug symbols can be captured and converted to a predetermined format for each DLL library and program component and persistently stored on the management server for every version of the DLL Library or program components that has been released. Then, when an error occurs in the client software 302, an automatic routine "walks" the program call stack and obtains register and other information. This information is then stored in the event store 318 and can later be transmitted to the management server 324. When this information arrives on the management server it is processed against the previously stored "debug" symbols, and detailed source file and line number information can be produced showing precisely where the error occurred in the client software 302. It is possible to generate a report that summarizes this information across all users defined on the management server to determine the severity or frequency of particular errors, which could be used to prioritize efforts to resolve them. After the problem is corrected, the management server can broadcast the location of a new component to the client software 302 that fixes, or removes, the error.

Statistical reports can also be generated, by transmitting the contents of the statistical store 314 to the management server using the same SOAP mechanism as is used to transmit events. Once the statistical information is received it can be placed in a table and used to generate reports. Reports detailing the collaborative software usage in an organization might include total hours of use of client software usage by time period, e.g. weekly, usage of specific tools, number of shared spaces created and deleted and size of shared spaces (number of members). Statistical reporting can be both at an aggregate level and at a granular level, including the ability to track a specific account or device in an organization.

A software implementation of the above-described embodiment may comprise a series of computer instructions either fixed on a CRSM (Computer Readable Storage Medium), for example, a diskette, a CD-ROM, a ROM memory, or a fixed disk, or transmittable to a computer system via a CRTM (Computer Readable Transmission Medium), for example via a modem or other interface device over a medium. The CRTM can either be a tangible medium, including but not limited to optical or analog communications lines, or may be implemented with wireless techniques, including but not limited to microwave, infrared or other transmission techniques. The CRTM may also be the Internet. The series of computer instructions embodies all or part of the functionality previously described herein with respect to the invention. Those skilled in the art will appreciate that such computer instructions can be written in a number of programming languages for use with many computer architectures or operating systems. Further, such instructions may be stored using any memory technology, present or future, including, but not limited to, semiconductor, magnetic, optical or other memory devices, or transmitted using any communications technology, present or future, including but not limited to optical, infrared, microwave, or other transmission technologies. It is contemplated that such a computer program product may be distributed as a removable media with accompanying printed or electronic documentation, e.g., shrink wrapped software, pre-loaded with a computer system, e.g., on system ROM or fixed disk, or distributed from a server or electronic bulletin board over a network, e.g., the Internet or World Wide Web.

Although an exemplary embodiment of the invention has been disclosed, it will be apparent to those skilled in the art that various changes and modifications can be made which will achieve some of the advantages of the invention without departing from the spirit and scope of the invention. For example, it will be obvious to those reasonably skilled in the art that, in other implementations, different arrangements can be used for the scope and arrangement of the federated beans.

Other aspects, such as the specific process flow, as well as other modifications to the inventive concept are intended to be covered by the appended claims.

What is claimed is:

1. A method for managing a peer-to-peer collaboration system, the method comprising:
   (a) using client software operating in a first device and client software operating in a second device to connect a first user of the first device to a second user of the second device in a peer-to-peer collaboration session including the first user and second user, the first user having a first collaboration identity in a shared space and the second user having a second collaboration identity in the shared space;
   (b) downloading from a management server to the client software operating in the first device a definition file containing a definition of a managed entity;
   (c) associating a management identity in the definition file with the first collaboration identity or first device information in the client software operating in the first device in order to create the managed entity, the management identity associated with the managed entity being different than the first collaboration identity, the management identity allowing the first user or the first device to be identified by the management server, wherein said associating comprises incorporating information from the definition file into another file stored on the first device, wherein the definition file is an operating system registry file, and the another file is a portion of a system registry on the first device;
   (d) interacting, between the management server and the client software operating in the first device using the management identity, to exchange management information associated with operation of the managed entity in the peer-to-peer collaboration session separately from collaborative information exchanged between the first user and the second user, wherein the management information exchanged comprises at least a policy restriction file, wherein said interacting further comprises steps:
      i) creating a client list of policy restrictions in the client software operating in the first device of the managed entity;
      ii) sending the client list of policy restrictions to the management server;
      iii) creating a server list of policy restrictions in the management server;
      iv) comparing the client list of policy restrictions to the server list of policy restrictions; and
      v) adjusting and synchronizing the client list of policy restrictions in the client software operating in the first device based on the comparison on step iv);
      wherein the steps i) to v) are repeated; and
   (e) in response to information in the policy restriction file, restricting at least one function in the client software.

2. The method of claim 1 wherein the managed entity is a managed user, the definition file is an injectible identity file, and the another file on the first device is a user account file.

3. The method of claim 1 wherein the managed entity is a managed device and the definition file is a device information file.

4. The method of claim 1, wherein the management information exchanged is a license file and said interacting comprises in response to information in the license file, enabling at least one function in the client software.

5. The method of claim 1, wherein the management information comprises event notifications and statistical information and said interacting to exchange the management information comprises:
   i) periodically sending the event notifications and the statistical information from the client software operating in the first device of the managed entity to the management server.

6. The method of claim 5 wherein the event notifications include error notifications.

7. The method of claim 5 wherein the event notifications and the statistical information are temporarily stored in a memory located at a client site.

8. Apparatus comprising a computer adapted to operate within a managed peer-to-peer collaboration system, the computer being a first device and the managed peer-to-peer collaboration system comprising a second device, the apparatus comprising:
   client software recorded on computer storage media in the first device, the software when operated, connecting a first user of the first device to a second user in a peer-to-peer collaboration session including the first and second users, the first user having a first collaboration identity in a shared space and the second user having a second collaboration identity in the shared space;
   a download manager that downloads from a management server to the client software operating in the first device a definition file containing a definition of the identity of a managed entity, wherein the definition file is an operating system registry file;
   a mechanism in the client software that associates the definition with the first collaboration identity or first device information in order to create the managed entity, the management identity associated with the managed entity being different than the first collaboration identity, the management identity allowing the first user or the first device to be identified by the management server, wherein associating comprises incorporating the definition of the identity of the managed entity into another file stored on the first device, the another file being a portion of a system registry on the first device; and
   a mechanism that exchanges management information relating to the managed entity between the client software operating in the first device and the management server using the management identity, the management information relating to monitoring operation of the managed entity and/or synchronizing the managed entity with information on the management server, the management information exchanged being associated with the identity of the managed entity, wherein:
      the management information exchanged comprises at least a policy restriction file, wherein the policy restriction file comprises a list of policy restrictions in the client software operating in the first device or a list of policy restrictions in the management server;
      the exchange of management information is repeated; and
      the apparatus is adapted to, in response to information in the policy restriction file, restrict at least one function in the client software.

9. The apparatus of claim 8 wherein the managed entity is a managed user and the definition file is an injectible identity file.

10. The apparatus of claim 8 wherein the managed entity is a managed device and the definition file is a device information file.

11. The apparatus of claim 10 wherein the device information file is a Windows REG file.

12. The apparatus of claim 8, wherein the mechanism that exchanges information comprises:

policy control software in the management server that sends at least one policy restriction file from the management server to the managed user; and policy control software in the client software that, in response to information in the policy restriction file, restricts at least one function in the client software.

13. The apparatus of claim 8, wherein the mechanism that exchanges information comprises:

management software in the management server that creates a client list of policy restrictions in the client software of the managed user;

a transport mechanism that sends the client list to the management server;

management software in the client software that creates a server list of policy restrictions in the management server;

a mechanism that compares the client list to the server list; and a mechanism that periodically adjusts and synchronizes the policy restrictions in the client software in cooperation with the comparison mechanism.

14. The apparatus of claim 8, wherein the mechanism that exchanges information comprises:

customer service management software that periodically sends event notifications and statistical information from the client software of the managed user to the management server.

15. The apparatus of claim 14 wherein the event notifications include error notifications.

16. The method of claim 14 wherein event notifications and statistical information are temporarily stored in a memory located at a client site.

17. The apparatus of claim 8, wherein:

the exchanged management information comprises a license file; and the apparatus is adapted to, in response to information in the in the license file, enable at least one function in the client software.

18. The apparatus of claim 9, wherein the another file is a user account file.

19. At least one computer readable storage medium encoded with instructions, that are executable in a computer system to perform a method managing a peer-to-peer collaboration system, comprising acts of:

connecting a first user to a second user in a peer-to-peer collaboration session including the first and second users, the first user having a first collaboration identity in a shared space and the second user having a second collaboration identity in the shared space;

downloading from a management server to client software operating in the computer system a definition file containing a definition of a managed entity;

associating a management identity in the definition file with the first collaboration identity in the client software in order to create the managed entity, the management identity associated with the managed entity being different than the first collaboration identity, the management identity allowing the first user or the computer system to be identified by the management server, wherein associating comprises incorporating information from the definition file into another file stored on the computer system, wherein the definition file is an operating system registry file, and the another file is a portion of a system registry on the first device; and interacting with the management server using the management identity to exchange management information relating to the managed entity within a collaboration session using the shared space, wherein the management information exchanged comprises at least a policy restriction file, and the interacting further comprises:

in response to information in the policy restriction file, restricting at least one function in the client software, wherein said interacting further comprises steps:

i) creating a client list of policy restrictions in the client software operating in the computer system of the managed entity;

ii) sending the client list of policy restrictions to the management server;

iii) creating a server list of policy restrictions in the management server;

iv) comparing the client list of policy restrictions to the server list of policy restrictions; and v) adjusting and synchronizing the client list of policy restrictions in the client software operating on the computer system based on the comparison on step iv);

wherein the steps i) to v) are repeated.

20. The at least one computer readable storage medium of claim 19 wherein the managed entity is a managed user and the definition file is an injectible identity file.

21. The at least one computer readable storage medium of claim 19 wherein the managed entity is a managed device and the definition file is a device information file.

22. The at least one computer readable storage medium of claim 21 wherein the device information file is a Windows REG file.

23. The at least one computer readable storage medium of claim 19, wherein the program code for interacting comprises:

sending at least one policy restriction file from the management server to the managed user; and responding to information in the policy restriction file for restricting at least one function in the client software.

24. The at least one computer readable storage medium of claim 19, wherein the program code for interacting comprises:

creating a client list of policy restrictions in the client software of the managed user;

sending the client list to the management server;

creating a server list of policy restrictions in the management server;

comparing the client list to the server list; and cooperating with the comparing program code for adjusting and synchronizing the policy restrictions in the client software.

25. The at least one computer readable storage medium of claim 24 wherein the program code for adjusting and synchronizing the policy restrictions operates periodically.

26. The at least one computer readable storage medium of claim 19, wherein the program code for interacting comprises:

periodically sending event notifications and statistical information from the client software of the managed user to the management server.

27. The at least one computer readable storage medium of claim 26 wherein the event notifications include error notifications.

28. The at least one computer readable storage medium of claim 26 further comprising program code for temporarily storing event notifications and statistical information in a memory located at a client site.

29. The at least one computer readable storage medium of claim 19, wherein:
the exchanged management information comprises a license file; and
the interacting further comprises in response to information in the in the license file, enabling at least one function in the client software.

30. The at least one computer readable medium of claim 20, wherein the another file is a user account file.

31. Apparatus comprising a computer adapted to operate within a managed peer-to-peer collaboration system in which users having identities are directly connected to each other in a collaboration session using a shared space by client software operating in devices and wherein the users can communicate with a management server using the client software, the apparatus comprising:
means operable in devices for connecting a first user having a first collaboration identity in the shared space to a second user having a second collaboration identity in the shared space in a peer-to-peer collaboration session including the first and second users;
means for downloading from a management server to the client software a definition file containing a definition of the identity of the managed entity;
means in the client software for associating the identity of the managed entity with the first collaboration identity or first device information in the client software in order to create the managed entity, the management identity associated with the managed entity being different than the first collaboration identity, the management identity allowing the first user or the first device to be identified by the management server, wherein associating comprises incorporating the definition of the identity of the managed entity into another file on the first device, wherein the definition file is an operating system registry file, and the another file is a portion of a system registry on the first device;
means for exchanging management information associated with the managed entity using the management identity, the management information relating to the collaboration session, and the management information being exchanged between the client software operating in the first device and the management server, and the management information identifying an entity to which the information relates using the identity of the managed entity, wherein:
the management information exchanged comprises at least a policy restriction file, wherein the policy restriction file comprises a list of policy restrictions in the client software operating in the first device or a list of policy restrictions in the management server;
the exchange of management information is repeated; and
means for restricting at least one function in the client software in response to information in the policy restriction file.

32. The apparatus of claim 31 wherein the managed entity is a managed user and the definition file is an injectible identity file.

33. The apparatus of claim 31 wherein the managed entity is a managed device and the definition file is a device information file.

34. The apparatus of claim 33 wherein the device information file is a Windows REG file.

35. The apparatus of claim 31, wherein the means for exchanging management information comprises:
means for sending at least one policy restriction file from the management server to the managed user; and
means responsive to information in the policy restriction file for restricting at least one function in the client software.

36. The apparatus of claim 31, wherein:
the exchanged management information comprises a license file; and
the apparatus further comprises means for enabling at least one function in the client software in response to information in the in the license file.

37. The apparatus of claim 32, wherein the another file is a user account file.

* * * * *